United States Patent
Smith et al.

(10) Patent No.: US 10,491,524 B2
(45) Date of Patent: Nov. 26, 2019

(54) LOAD BALANCING SCHEME

(71) Applicant: Advanced Micro Devices, Inc., Sunnyvale, CA (US)

(72) Inventors: Alan Dodson Smith, Austin, TX (US); Chintan S. Patel, Bee Cave, TX (US); Eric Christopher Morton, Austin, TX (US); Vydhyanathan Kalyanasundharam, San Jose, CA (US); Narendra Kamat, West Lafayette, IN (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 15/805,762

(22) Filed: Nov. 7, 2017

(65) Prior Publication Data

US 2019/0140954 A1    May 9, 2019

(51) Int. Cl.
H04L 12/803    (2013.01)
H04L 12/935    (2013.01)
H04L 12/825    (2013.01)

(52) U.S. Cl.
CPC ............ H04L 47/125 (2013.01); H04L 47/25 (2013.01); H04L 49/30 (2013.01)

(58) Field of Classification Search
CPC ........ H04L 47/125; H04L 47/25; H04L 49/30
USPC .......................................................... 370/235
See application file for complete search history.

(56) References Cited

U.S. PATENT DOCUMENTS

| | | | |
|---|---|---|---|
| 5,966,381 A * | 10/1999 | Buckley | H04L 12/5602 370/236.1 |
| 6,078,944 A | 6/2000 | Enko et al. | |
| 6,266,324 B1 * | 7/2001 | Kirino | H04L 12/5601 370/230 |
| 6,298,477 B1 | 10/2001 | Kessler | |
| 6,345,041 B1 | 2/2002 | Kimball et al. | |
| 6,480,930 B1 | 11/2002 | Zakai et al. | |
| 6,560,717 B1 | 5/2003 | Scott et al. | |
| 7,437,581 B2 | 10/2008 | Grochowski et al. | |

(Continued)

OTHER PUBLICATIONS

International Search Report and Written Opinion in International Application No. PCT/US2012/037433, dated Aug. 6, 2012, 10 pages.

(Continued)

*Primary Examiner* — Yemane Mesfin
*Assistant Examiner* — Intekhaab A Siddiquee
(74) *Attorney, Agent, or Firm* — Meyertons Hood Kivlin Kowert and Goetzel PC; Rory D. Rankin (57) ABSTRACT

A system for implementing load balancing schemes includes one or more processing units, a memory, and a communication fabric with a plurality of switches coupled to the processing unit(s) and the memory. A switch of the fabric determines a first number of streams on a first input port that are targeting a first output port. The switch also determines a second number of requestors, from all input ports, that are targeting the first output port. Then, the switch calculates a throttle factor for the first input port by dividing the first number of streams by the second number of streams. The switch applies the throttle factor to regulate bandwidth on the first input port for requestors targeting the first output port. The switch also calculates throttle factors for the other ports and applies the throttle factors when regulating bandwidth on the other ports.

15 Claims, 10 Drawing Sheets

(56) References Cited

U.S. PATENT DOCUMENTS

| | | | |
|---|---|---|---|
| 8,312,455 | B2 | 11/2012 | Bell et al. |
| 8,782,645 | B2 | 7/2014 | Breternitz et al. |
| 9,189,268 | B2 * | 11/2015 | Rama .................. G06F 9/4843 |
| 2002/0147969 | A1 | 10/2002 | Lethin et al. |
| 2004/0168039 | A1 | 8/2004 | Park |
| 2005/0251667 | A1 | 11/2005 | Iwamoto |
| 2007/0283358 | A1 | 12/2007 | Kasahara |
| 2009/0165014 | A1 | 6/2009 | Park |
| 2009/0193231 | A1 | 7/2009 | Gschwind et al. |
| 2009/0222654 | A1 | 9/2009 | Hum et al. |
| 2009/0313507 | A1 | 12/2009 | Swaine et al. |
| 2010/0077236 | A1 | 3/2010 | Trautman et al. |
| 2010/0153959 | A1 | 6/2010 | Song et al. |
| 2011/0099542 | A1 | 4/2011 | Branda et al. |
| 2011/0213934 | A1 | 9/2011 | Greenhalgh et al. |
| 2011/0246998 | A1 | 10/2011 | Vaidya et al. |
| 2012/0079501 | A1 | 3/2012 | Sandstrom |
| 2017/0180254 | A1 * | 6/2017 | Certain .................. H04L 47/70 |

OTHER PUBLICATIONS

Jääskeläinen et al., "OpenCL-based Design Methodology for Application-Specific Processors", 2010 International Conference on Embedded Computer Systems: Architectures, Modeling and Simulation, Jul. 19, 2010, pp. 223-230.

Jiménez et al., "Predictive Runtime Code Scheduling for Heterogeneous Architectures", Proceedings of the 4th International Conference on High Performance Embedded Architectures and Compilers, Jan. 25, 2009, pp. 19-33.

Siegel et al., "Software Support for Heterogeneous Computing", ACM Computing Surveys, Mar. 1996, pp. 237-239, vol. 28, No. 1.

* cited by examiner

$$1005 \quad Active_{m,s,t} = if(\ (Cntr_{m,s,t} > 0)\ \&\ PktVal_{m,s,t}\ )$$

$$1010 \quad Active_{s,t} = \sum_{m=0}^{M-1} Active_{m,s,t} * Weight_m$$

$$1015 \quad Active_t = \sum_{s=0}^{N-1} Active_{s,t}$$

$$1020 \quad F_s = \sum_{t=0}^{N-1} \frac{Active_{s,t}}{Active_t}$$

FIG. 10

LOAD BALANCING SCHEME

BACKGROUND

Description of the Related Art

Computing systems are increasingly integrating large numbers of different types of components on a single chip or a multi-chip module. The complexity and power consumption of a system increases with the number of different types of components. Often, these components are connected together via switches, routers, communication buses, bridges, buffers, controllers, coherent devices, and other links. The combination of these interconnecting components is referred to herein as a "communication fabric", or "fabric" for short. Generally speaking, the fabric facilitates communication by routing messages between a plurality of components on an integrated circuit (i.e., chip) or multi-chip module. Examples of messages communicated over a fabric include memory access requests, status updates, data transfers, coherency probes, coherency probe responses, and the like.

Integrating large numbers of different types of components on a single chip or on a multi-chip module often results in irregular fabric topologies. With irregular fabric topologies, implementing fairness in the fabric routers can be challenging. In lossless flow-controlled networks that employ token flow control, tokens released by a receiver provide the transmitter with guaranteed buffer availability at the receiver. Multiple masters in an asymmetric distributed network topology can be subject to unequal bandwidth distribution between masters. As used herein, a "master" is any entity that can issue packets into the network.

In many cases, the desire is to provide Equality of Service (EoS), where each master gets a fair share of the available bandwidth. Static partitioned bandwidth allocation can be pessimistic if it throttles bandwidth even when there is no contention for the downstream resource. At the other extreme, a static allocation scheme can be designed where each master will always have enough resources available to achieve maximum bandwidth. However, this approach is wasteful since the design is sized for the worst case. Some network implementations employ symmetric topologies with star or ring routing where the average number of hops for each master toward the shared resource is the same. By keeping the number of hops balanced, bandwidth would naturally be evenly shared. This comes at area and power cost since additional switches are required to create this symmetric network topology. As topologies continue to scale up, carrying such inefficiencies can be expensive.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for implementing load balancing schemes are disclosed herein. In one embodiment, a system includes at least one or more processing units, a communication fabric, and one or more memory devices. The fabric is coupled to the processing unit(s) and memory device(s), and the fabric includes a plurality of switches. Each of the switches includes any number of input ports and any number of output ports, with the number of ports varying from embodiment to embodiment. Some of the switches will service multiple clients that target a common destination.

In one embodiment, a switch in the fabric calculates how many active masters are on a first input port targeting a first output port. The number of active masters on the first input port targeting the first output port can be referred to as a first number. Also, the switch calculates how many active masters from all input ports are targeting the first output port. The number of active masters from all input ports targeting the first output port can be referred to as a second number. Next, the switch calculates a throttle factor for the first input port by dividing the first number by the second number. Then, the switch applies the throttle factor to regulate bandwidth on streams from the first input port targeting the first output port. The switch can also perform this sequence of steps for the other input ports that are targeting the first output port. Additionally, the switch can perform this sequence of steps for any streams targeting other output ports other than the first output port.

In one embodiment, applying the throttle factor to regulate bandwidth on the first input port targeting the first output port involves determining a number of tokens which are available for allocating to streams targeting the first output port through the switch. Next, the switch multiplies the throttle factor by the number of tokens which are available for allocating to streams targeting the first output port through the switch. Then, the switch allocates a first number of tokens to the masters on the first input port, wherein the first number of tokens is equal to the product of this multiplication.

Figure 1:
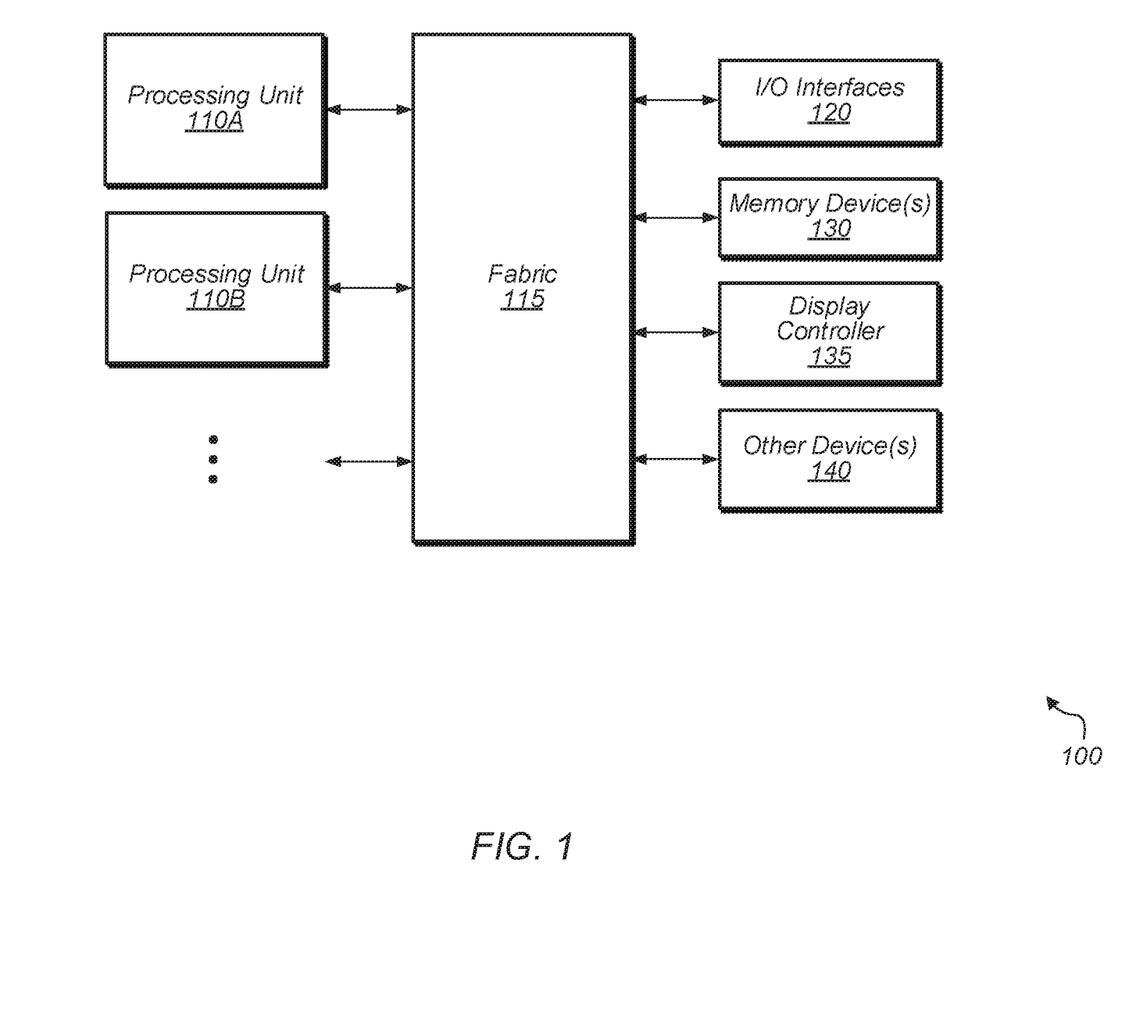
FIG. 1 is a block diagram of one embodiment of a computing system.

Referring now to FIG. 1, a block diagram of one embodiment of a computing system 100 is shown. In one embodiment, computing system 100 includes at least processing units 110A-B, fabric 115, input/output (I/O) interfaces 120, memory device(s) 130, display controller 135, and other device(s) 140. In other embodiments, computing system 100 can include other components and/or computing system 100 can be arranged differently. Processing units 110A-B are representative of any number and type of processing units. For example, in one embodiment, processing unit 110A is a central processing unit (CPU) and processing unit 110B is a graphics processing unit (GPU). In other embodiments, processing units 110A-B can include other numbers and types of processing units (e.g., digital signal processor (DSP), field programmable gate array (FPGA), application specific integrated circuit (ASIC)).

Memory device(s) 130 are representative of any number and type of memory devices. For example, the type of memory in memory device(s) 130 can include Dynamic Random Access Memory (DRAM), Static Random Access Memory (SRAM), NAND Flash memory, NOR flash memory, Ferroelectric Random Access Memory (FeRAM), or others. Memory device(s) 130 are accessible by processing units 110A-B, I/O interfaces 120, display controller 135, and other device(s) 140 via fabric 115. I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices can be coupled to I/O interfaces 120. Such peripheral devices include (but are not limited to) displays, keyboards, mice, printers, scanners, joysticks or other types of game controllers, media recording devices, external storage devices, network interface cards, and so forth. Other device(s) 140 are representative of any number and type of devices (e.g., multimedia device, video codec).

Fabric 115 is representative of any communication interconnect and any protocol for communicating among the components of the system 100. Fabric 115 provides the data paths, switches, routers, multiplexers, controllers, and other logic that connect the processing units 110A-B, I/O interfaces 120, memory device(s) 130, and other device(s) 140 to each other. Fabric 115 handles the request, response, and data traffic, as well as probe traffic to facilitate coherency. Fabric 115 also handles interrupt request routing and configuration access paths to the various components of system 100. Fabric 115 can be bus-based, including shared bus configurations, cross bar configurations, and hierarchical buses with bridges. Fabric 115 can also be packet-based, and can be hierarchical with bridges, cross bar, point-to-point, or other interconnects. From the point of view of fabric 115, the other components of system 100 can be referred to as "clients". Fabric 115 is configured to process packets generated by various clients and pass the packets on to other clients.

In one embodiment, fabric 115 includes a plurality of switches. The switches can also be referred to as crossbars, routers, or arbitration points. In one embodiment, transmission and receipt of packets through the switches of fabric 115 are flow controlled using a token based scheme. In one embodiment, each transmitter uses tokens to keep a count of the command and data buffers available in each virtual channel (VC) at the receiver, where a token represents a guaranteed buffer at the receiver. In one embodiment, the receiver distributes a programmable number of tokens during initialization. When a packet is sent, the transmitter decrements the token count. When the switch routes the packet forward to the next hop, or the destination, the switch de-allocates a packet entry and then a token becomes available.

In one embodiment, the switches of fabric 115 implement a tracking scheme by dynamically detecting inequalities across input ports based on the number of active masters per input port targeting a given output port. As used herein, a "master" is defined as a component that either generates packets or forwards packets from another source or component into fabric 115. In one embodiment, each switch builds heuristics to determine how many active masters are upstream from each switch input port. Each switch also determines to which downstream output ports the input streams are going. In one embodiment, a "stream" is defined as a group of packets with a particular property or characteristic. Examples of packet properties that can be used to differentiate between separate streams include, but are not limited to, a virtual channel, a requestor, type of requestor, local or remote, and type of packet (e.g., read, write). For example, a given stream can be defined as including packets generated by requestors that share a common property, such as all of the requestors being CPU requestors. In another embodiment, a "stream" is defined as a group of packets sent by a single requestor to a single destination. The packets in the stream can be transmitted at a constant or predictable rate.

Building heuristics gives the switch information on the number of masters per input port and on any interference, or lack thereof, between streams. In other embodiments, the switches of fabric 115 track the number of traffic classes, the number of virtual channels (VCs), the number of reads, the number of writes, the number of local packets, the number of remote packets, or the number of other types of entities on each input port. It should be understood that while some of the embodiments described herein refer to a switch determining a number of masters per input port, the methods and mechanisms are not limited to these embodiments.

For example, let N be the number of ports on a switch of fabric 115, and let M be the number of masters behind each port of the switch. The switch uses a plurality of counters $Cntr_{m,s,t}$ to track activity levels of the different streams. For example, a given counter $Cntr_{m,s,t}$ tracks the activity level of master m from source port s to target port t. The given switch can also specify a weight $Weight_m$ which indicates the relative bias for master m compared to the other masters. $Weight_m$ can be used to prioritize certain masters over others. To achieve equality of service, the weights would be set to the same value across the masters. The switch can also specify a $Window_m$ which is a time interval used to determine whether the master m is active or not. This allows the switch to accommodate masters with different traffic patterns.

When a packet enters the switch from master m on port s destined toward port t, $Cntr_{m,s,t}$ is reset to $Window_m$. When a packet leaves the switch through port t, the counters $Cntr_{*,*,t}$ are decremented by one. By tracking each output port independently, if one output port is blocked, the status of active masters in that stream are not artificially expired. Whenever the $Cntr_{m,s,t}$ is non-zero, and a new packet arrives ($PktVal_{m,s,t}$), then Master m is deemed active ($Active_{m,s,t}$) toward output port t. In one embodiment, determining if Master m on source port s is active toward output port t is calculated according to formula 1005 (of FIG. 10).

Figure 10:
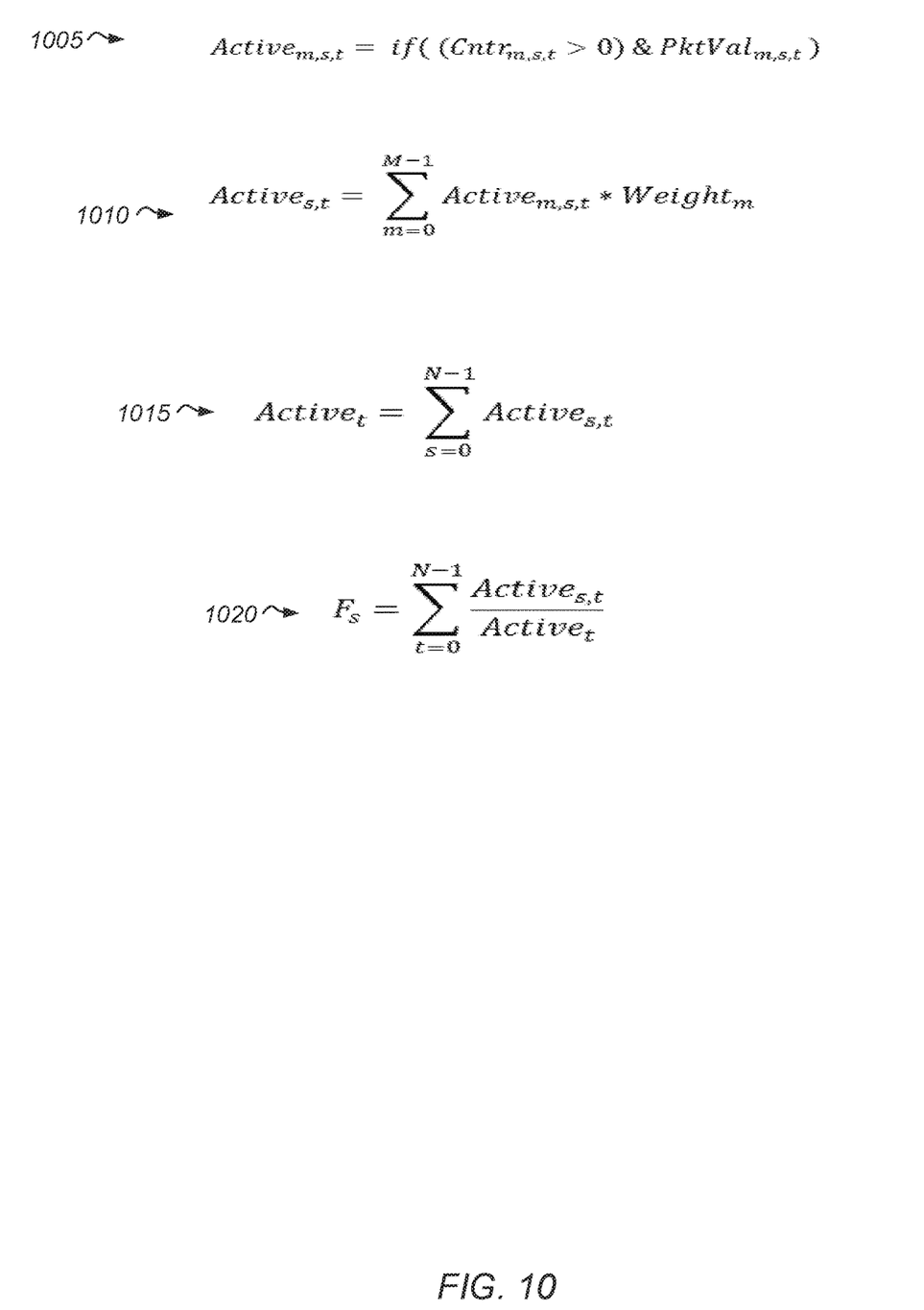
FIG. 10 illustrates formulas for calculating numbers of active masters and throttle factors.

In one embodiment, for each source port s targeting an output port t, the number of active masters is calculated using formula 1010 (of FIG. 10). After measuring the active masters on each input port targeting an output port t, the total number of masters active for the switch targeting output port t can be calculated using formula 1015. In one embodiment, per-input throttle factors ($F_s$) are calculated by taking the masters active per port over the total masters active on the switch targeting the same output port as shown in formula 1020.

This throttle factor $F_s$ can be dynamically applied to the flow control scheme of the network to regulate input bandwidth. Fabric 115 can employ a network that is flow controlled using tokens, and in one embodiment, the throttle factor $F_s$ can determine how tokens are distributed to the input ports based on the distribution of active masters to the various input ports. In another embodiment, the throttle factor $F_s$ can be used to communicate a stall to an incoming port per virtual channel (VC). This stall can be communicated in-band or through a sideband. In a further embodiment, each switch of fabric 115 can apply a throttle, based on the throttle factor $F_s$, on the packets that are flowing through the switch instead of relying on the requestors to throttle themselves.

In various embodiments, computing system 100 can be a computer, laptop, mobile device, server or any of various other types of computing systems or devices. It is noted that the number of components of computing system 100 can vary from embodiment to embodiment. There can be more or fewer of each component than the number shown in FIG. 1. It is also noted that computing system 100 can include other components not shown in FIG. 1. Additionally, in other embodiments, computing system 100 can be structured in other ways than shown in FIG. 1.

Figure 2:
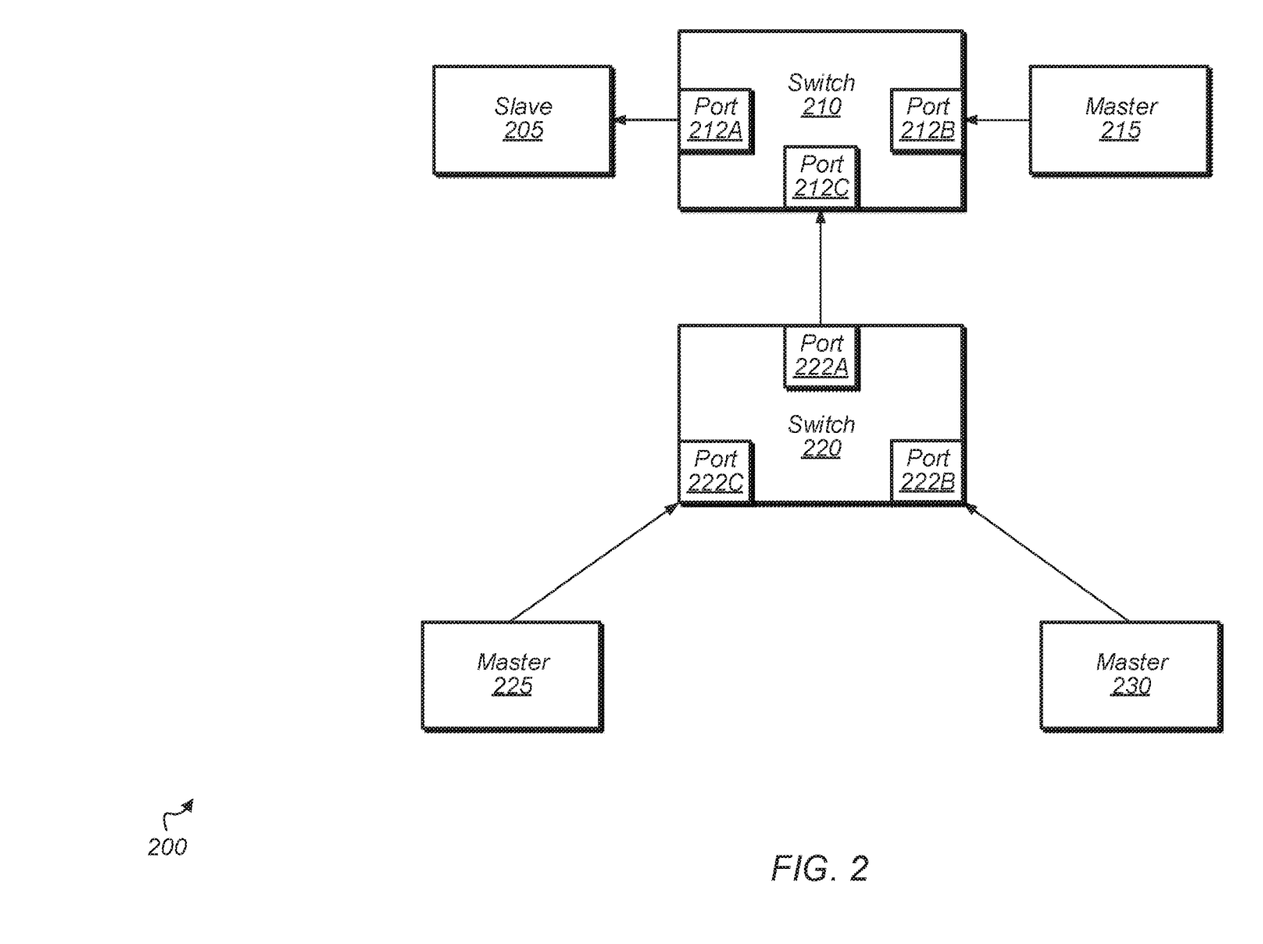
FIG. 2 is a block diagram of one embodiment of a communication fabric.

FIG. 2 is a block diagram of one embodiment of fabric 200. As shown in FIG. 2, fabric 200 includes slave 205 and master 215 coupled to ports 212A and 212B, respectively, of switch 210 and masters 225 and 230 coupled to ports 222C and 222B, respectively, of switch 220, with port 222A of switch 220 coupled to port 212C of switch 210. It is noted that in other embodiments, switches can have other numbers of ports and other numbers of connections to other switches, masters, and/or other components. As used herein, a "master" is defined as a component that either generates packets or forwards packets from another source or component, and a "slave" is defined as a component that services packets.

Generally speaking, fabric 200 illustrates an embodiment where switch 210 has multiple masters behind one port (port 212C), and a single master behind another port (port 212B), targeting the same downstream resource (slave 205). For switch 210, a naïve way of splitting up the bandwidth targeting slave 205 would be to split the bandwidth evenly between ports 212B and 212C. However, this would result in master 215 getting 50% of the total bandwidth to slave 205 and masters 225 and 230 each getting 25% of the total bandwidth to slave 205. For embodiments where it is desired to provide equal bandwidth to masters 215, 225, and 230, this approach would not achieve the desired goal. Rather, to achieve the goal of providing equal bandwidth to masters 215, 225, and 230, switch 210 should allocate more bandwidth to the port (port 212C) with the higher number of masters.

In one embodiment, switch 210 implements a tracking scheme to dynamically detect inequalities among input ports and adjust bandwidth sharing as necessary. In one embodiment, switch 210 builds heuristics to determine how many active masters are upstream from each switch input port. As used herein, the term "upstream" is defined as moving toward the source of the packets being transmitted. Switch 210 also determines to which downstream output ports are being targeted by the input streams. This allows switch 210 to determine a number of masters per input port and any interference between streams. As used herein, the term "downstream" is defined as moving toward the destination of the packets being transmitted. Additionally, a packet can also be referred to as a transaction or a request herein.

In one embodiment, switch 210 calculates per-input throttle factors by dividing the number of active masters per input port by the total number of active masters on the switch targeting the same output. The per-input throttle factor is then dynamically applied to the flow control scheme of the network to regulate input bandwidth. For the topology shown in fabric 200, the throttle factor for port 212C would be ⅔ and the throttle factor for port 212B would be ⅓ for streams targeting port 212A. Accordingly, in one embodiment, switch 210 would utilize these throttle factors to allocate ⅔ of the available bandwidth to port 212C and masters 225 and 230, and switch 210 would allocate ⅓ of the available bandwidth to port 212B and master 215. This would allow each of the three masters 215, 225, and 230 to get ⅓ of the total bandwidth toward slave 205. In one embodiment, switch 210 allocates bandwidth by providing tokens to switch 220 and master 215. In this embodiment, switch 210 would allocate ⅓ of the available tokens to master 215 and switch 210 would allocate ⅔ of the available tokens to switch 220. Switch 220 can then allocate half of its tokens to master 225 and the other half to master 230.

Figure 3:
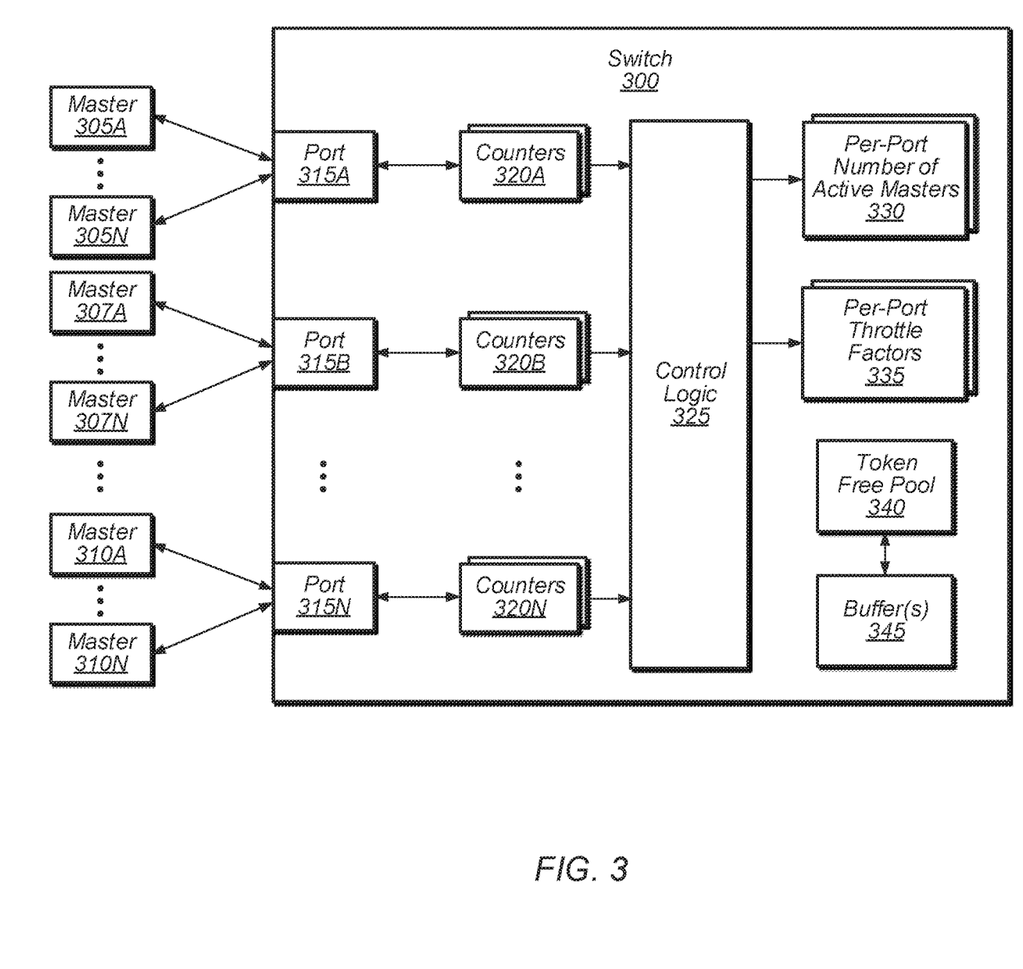
FIG. 3 is a block diagram of one embodiment of a switch.

Referring now to FIG. 3, a block diagram of one embodiment of a switch 300 is shown. Switch 300 includes ports 315A-N, which are representative of any number and type (e.g., input, output, bidirectional) of ports. Any number of masters 305A-N, 307A-N, and 310A-N are coupled to each of ports 315A, 315B, and 315N, respectively. In one embodiment, switch 300 is configured to implement a token flow control scheme by allocating tokens from token free pool 340 to the various masters 305A-N, 307A-N, and 310A-N sending packets to switch 300. When switch 300 provides a token to a given transmitter (i.e., one of masters 305A-N, 307A-N, and 310A-N), the token indicates that there is guaranteed buffer space in buffer(s) 345 for the given transmitter to send a packet to switch 300. Depending on the embodiment, switch 300 can convey a signal for allocating one or more tokens to a transmitter on the main data interface or on a separate channel. As packets are forwarded out of buffer(s) 345 through an output port to a destination, a token is added to token free pool 340.

Switch 300 also includes counters 320A-N, which are representative of any number and type of counters which are needed to track the number of active masters 305A-N, 307A-N, and 310A-N coupled to switch 300. For example, counters 320A can include a counter for each active master 305A-N coupled to port 315A. Accordingly, switch 300 can include any number of counters corresponding to each port 315A-N. For example, counters 320A can include a separate counter for each master 305A-N coupled to port 315A targeting a different destination. If there is only a single master 305A coupled to port 315A and targeting a single destination, then control logic 325 allocates a single counter 320A for port 315A to track this single master 305A. In another embodiment, counters 320A track the active virtual channels (VCs) on port 315A. Likewise, in this embodiment, counters 320B-N track the active VCs on ports 315B-N, respectively. In other embodiments, counters 320A-N can track other entities on their corresponding ports 315A-N, such as traffic classes, read packets, write packets, or other types of traffic.

In one embodiment, each counter of counters 320A-N tracks a given master 305A-N, 307A-N, or 310A-N from a given source port 315A-N to a particular target port 315A-N. The number of counters 320A-N can vary from embodiment to embodiment and over time as the number of active masters fluctuates during operation. When a packet enters switch 300 from a given master from a given source port destined toward a given destination port, a corresponding counter (for the given master, given source port, and given destination port) is reset to a programmable time interval value. The programmable time interval value can also be referred to as a window. This window (i.e., $Window_m$) specifies a time interval which is used to determine whether the given master is active or not. When a packet leaves switch 300 on a given destination port, any counters tracking any active masters for that given destination port are decremented by one. By tracking each destination port independently, if one destination port is blocked, this will not result in artificially expiring the status of active masters for this stream. Whenever a counter for a given master, source port, destination port combination is non-zero and a new packet arrives for the given combination, then the given master is deemed active toward the destination port. Whenever a counter for a given master, source port, destination port combination is equal to zero, switch 300 classifies the corresponding master as inactive.

Switch 300 also includes control logic 325 to monitor the values of counters 320A-N corresponding to the various masters, and control logic 325 determines whether these masters are active based on the values of their corresponding counters 320A-N. Control logic 325 can be implemented using any suitable combination of hardware and/or software. In one embodiment, control logic 325 calculates a number of active masters 330 for each input port based on the values of counters 320A-N. Control logic 325 also calculates how many active masters 330 are targeting each output port based on the values of counters 320A-N.

In one embodiment, control logic 325 calculates per-port throttle factors 335 by determining the number of active masters 330 per input port targeting a given output port and then dividing this number by the number of total active masters of switch 300 targeting the given output port. For example, the number of active masters on port 315A which are targeting a given destination (e.g., port 315N) are calculated. Then, the total number of active masters on switch 300, on all of the input ports, that are targeting the given destination are calculated. The number of active masters on port 315A targeting the given destination is divided by the total number of active masters of switch 300 targeting the given destination. This value is then used to define the throttle factor for port 315A for masters targeting the given destination. The throttle factors 335 for the other ports are calculated in a similar manner.

Then, after calculating throttle factors 335 for each of ports 315A-N, switch 300 utilizes throttle factors 335 to bias the allocation of tokens from token free pool 340 to the ports 315A-N. For example, if the throttle factor 335 is ¼ for port 315A, ½ for port 315B, and ¼ for port 315N for streams targeting a given destination, and there are a total of 12 tokens available in token free pool 340 for targeting the given destination, allocating tokens based on the throttle factors 335 will result in 3 tokens being allocated to the active masters on port 315A (12 tokens*¼), 6 tokens being allocated to the active masters on port 315B (12 tokens*½), and 3 tokens being allocated to the active masters on port 315N (12 tokens*¼). In other embodiments, with other values of throttle factors 335 and other numbers of tokens in token free pool 340, similar techniques can be implemented to allocate tokens to the active masters on the various ports 315A-N.

Figure 4:
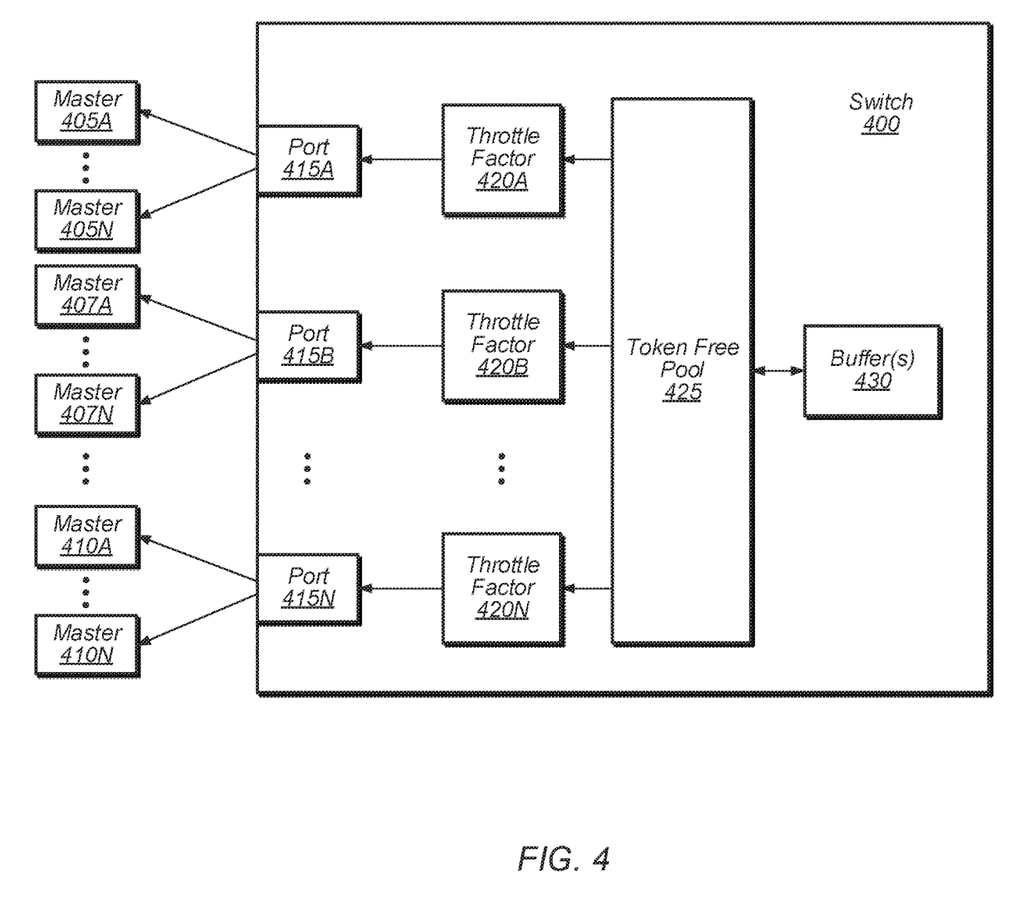
FIG. 4 is a block diagram of another embodiment of a switch.

FIG. 4 is a block diagram of one embodiment of a switch 400 for applying throttle factors 420A-C when allocating tokens to ports 415A-N. Switch 400 includes buffer(s) 430, which are representative of any number and type of buffers, queues, or other storage elements for storing incoming packets. When a packet stored in buffer(s) 430 is forwarded out of switch 400, this frees up a packet entry in buffer(s) 430, and a token is added to token free pool 425. Tokens in token free pool 425 are allocated to the various masters 405A-N, 407A-N, and 410A-N coupled to ports 415A-N, respectively.

In one embodiment, switch 400 calculates a throttle factor 420A-N corresponding to each port 415A-N. Each throttle factor 420A-N is calculated by determining the number of active masters per port targeting a given destination divided by the total number of active masters targeting the given destination from all of the ports of switch 400. These throttle factors 420A-N are then utilized for determining how to divide the tokens in token free pool 425 among the various ports 415A-N. This ensures a fairness per port 415A-N. The tokens allocated to each port 415A-N are then divided among the masters on each port based on the desired distribution. In one embodiment, switch 400 assigns a weight to each active master on a given port 415, and the weight determines the number of tokens allocated to the master from the pool assigned to the given port 415. A master with a higher priority or a greater relative importance can have a higher weight.

Figure 5:
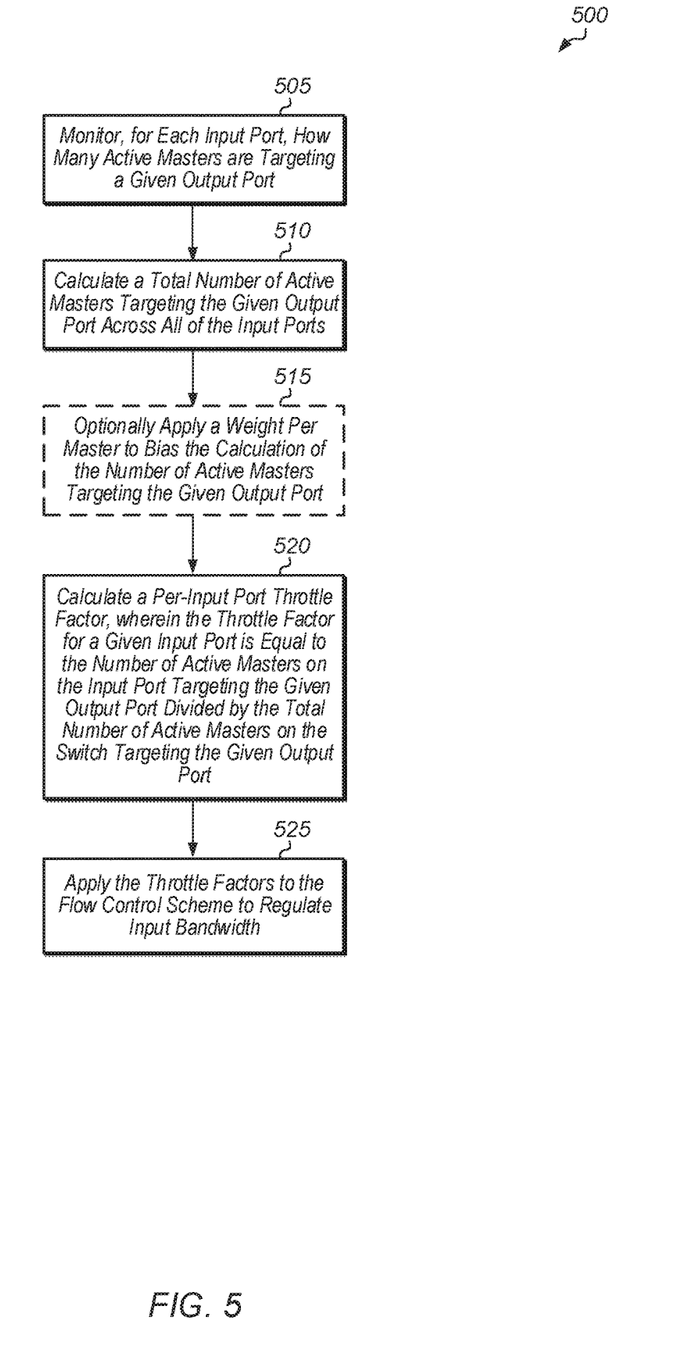
FIG. 5 is a generalized flow diagram illustrating one embodiment of a method for implementing a load balancing scheme.

Referring now to FIG. 5, one embodiment of a method 500 for implementing a load balancing scheme is shown. For purposes of discussion, the steps in this embodiment and those of FIG. 6-9 are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement method 500.

A switch monitors, for each input port, how many active masters are targeting a given output port (block 505). One example of an implementation of block 505 in accordance with one embodiment is described below in the discussion regarding method 600 of FIG. 6. It is noted that a master can also be referred to as a requestor herein. Also, the switch calculates a total number of active masters targeting the given output port across all of the input ports (block 510). One example of an implementation of block 510 in accordance with one embodiment is also described below in the discussion regarding method 600. Additionally, the switch optionally applies a weight per master to bias the calculation of the number of active masters targeting the given output port (block 515). Next, the switch calculates a per-input port throttle factor, wherein the throttle factor for a given input port is equal to the number of active masters on the input port targeting the given output port divided by the total number of active masters on the switch targeting the given output port (block 520). Then, the switch applies the throttle factors to the flow control scheme to regulate input bandwidth (block 525). One example of an implementation of block 525 in accordance with one embodiment is described below in the discussion regarding method 700 of FIG. 7. After block 525, method 500 ends.

Figure 6:
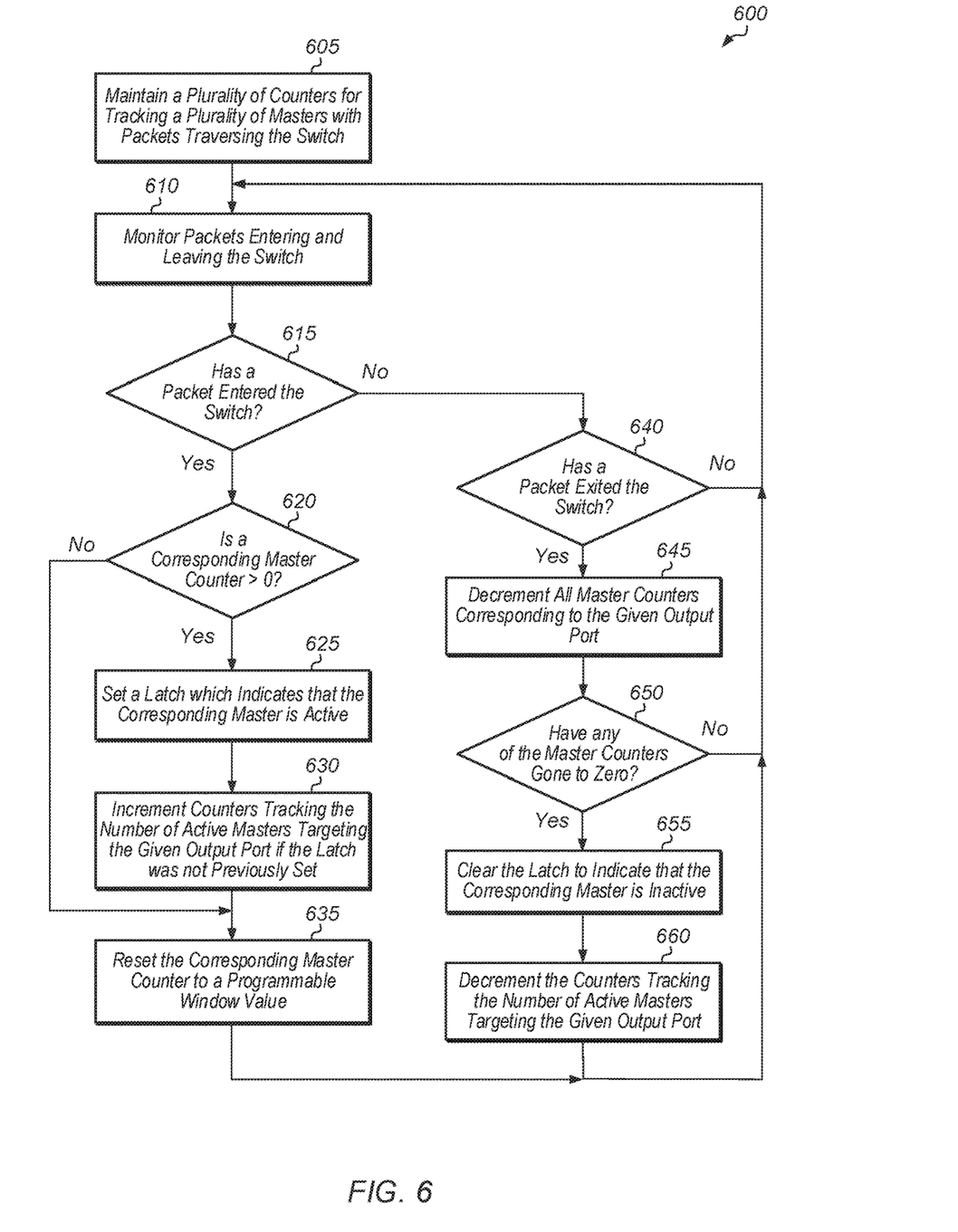
FIG. 6 is a generalized flow diagram illustrating one embodiment of a method for monitoring active masters on a switch.

Turning now to FIG. 6, one embodiment of a method 600 for monitoring active masters on a switch is shown. The switch maintains a plurality of counters for tracking a plurality of masters with packets traversing the switch (block 605). The plurality of counters includes a counter for each master, with these counters referred to as master counters. The master counters are utilized to determine if the corresponding masters are currently active. The plurality of counters maintained by the switch also include first counters for each input port to track the number of masters on a respective input port targeting a given output port. The plurality of counters maintained by the switch also include second counters to track the total number of masters on all input ports of the switch that are targeting a given output port. Additionally, the switch monitors packets entering and leaving the switch (block 610).

When a packet enters the switch on one of the input ports (conditional block 615, "yes" leg), the switch determines if a corresponding master counter is greater than zero (conditional block 620). The corresponding master counter corresponds to the master, input port, and output port targeted by the packet. If the corresponding master counter is greater than zero (conditional block 620, "yes" leg), then a latch is set which indicates that the corresponding master is active (block 625). Also, the switch increments counters tracking the number of active masters targeting the given output port if the latch was not previously set (block 630). The counters which are incremented in block 630 include a first counter tracking the number of masters on the input port where the packet entered which are targeting the output port targeted by the packet. The counters which are incremented in block 630 also include a second counter tracking the total number of masters traversing the switch which are targeting the output port targeted by the packet. Additionally, the switch resets the corresponding master counter to a programmable window value (block 635). If the corresponding master counter is equal to zero (conditional block 620, "no" leg), then method 600 jumps to block 635. If a packet has not entered the switch (conditional block 615, "no" leg), then the switch determines if a packet has exited the switch through an output port (conditional block 640).

If a packet exits the switch through an output port (conditional block 640, "yes" leg), then all master counters corresponding to the given output port are decremented (block 645). If any of the master counters goes to zero (conditional block 650, "yes" leg), then the latch for the corresponding master is cleared to indicate that the master is inactive (block 655). Also, the switch decrements the counters tracking the number of active masters targeting the given output port (block 660). After block 660, method 600 returns to block 610.

Figure 7:
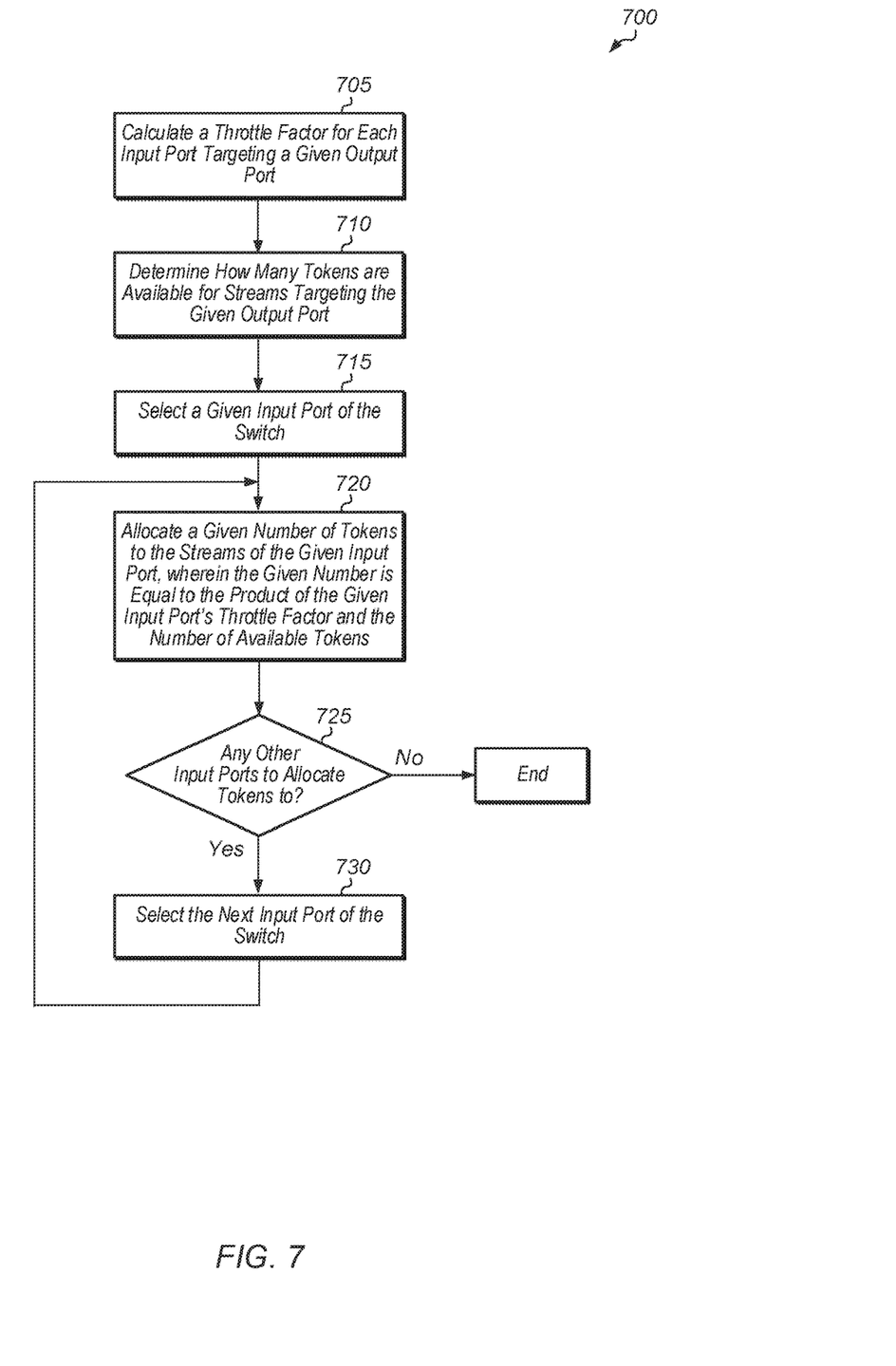
FIG. 7 is a generalized flow diagram illustrating one embodiment of a method for dynamically applying a throttle factor to a flow control scheme to regulate bandwidth.

Referring now to FIG. 7, one embodiment of a method 700 for dynamically applying a throttle factor to a flow control scheme to regulate bandwidth is shown. A switch calculates a throttle factor for each input port targeting a given output port (block 705). Next, the switch determines how many tokens are available for streams targeting the given output port (block 710). Then, a given input port of the switch is selected (block 715). Next, the switch allocates a given number of tokens to the streams of the given input port, wherein the given number is equal to the product of the given input port's throttle factor and the number of available tokens (block 720). Next, if there are any other input ports of the switch with streams targeting the given output port that have not yet had tokens allocated (conditional block 725, "yes" leg), then the next input port of the switch is selected (block 730), and then method 700 returns to block 720. If the other input ports of the switch have already been allocated tokens (conditional block 725, "no" leg), then method 700 ends. It is noted that method 700 can be performed multiple times for the various output ports of the switch.

Figure 8:
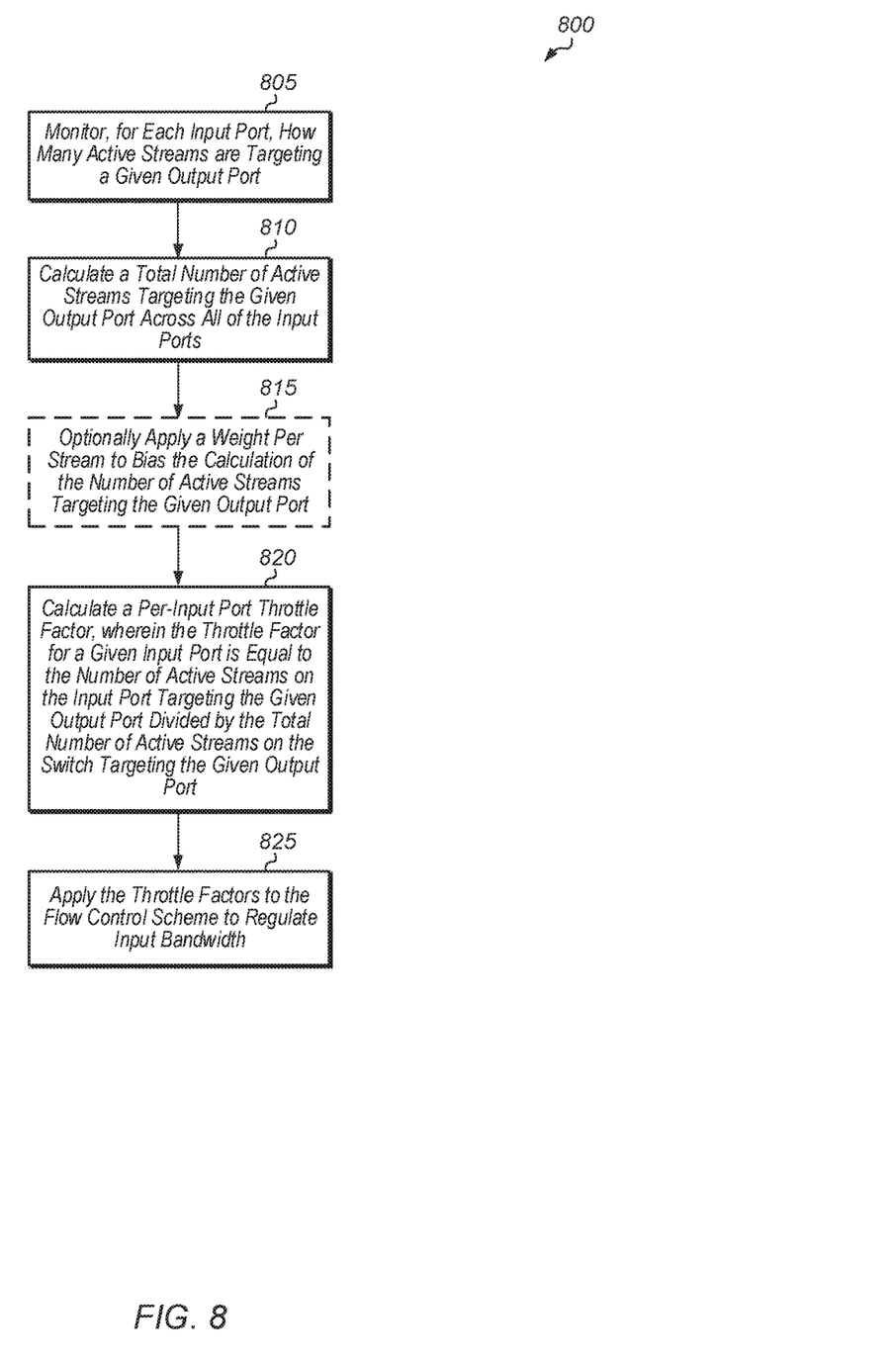
FIG. 8 is a generalized flow diagram illustrating another embodiment of a method for implementing a load balancing scheme.

Turning now to FIG. 8, another embodiment of a method 800 for implementing a load balancing scheme is shown. A switch monitors, for each input port, how many active streams are targeting a given output port (block 805). One example of an implementation of block 805 in accordance with one embodiment is described below in the discussion regarding method 900 of FIG. 9. Each stream corresponds to a group of packets with a particular property or characteristic. For example, in one embodiment, there is a separate stream for each master which generates packets that traverse the switch. In another embodiment, there is a separate stream for each virtual channel (VC). In a further embodiment, in a multi-node network, the switch classifies packets as belonging to separate streams based on whether the packets are local or remote. For example, there can be a first stream for local packets and a second stream for remote packets. Also, this embodiment can be extended further by identifying specific nodes in the system and/or specifying a specific node as a proxy for a group of masters. In other embodiments, other ways of differentiating streams based on other properties or characteristics of the packets are possible and are contemplated.

Figure 9:
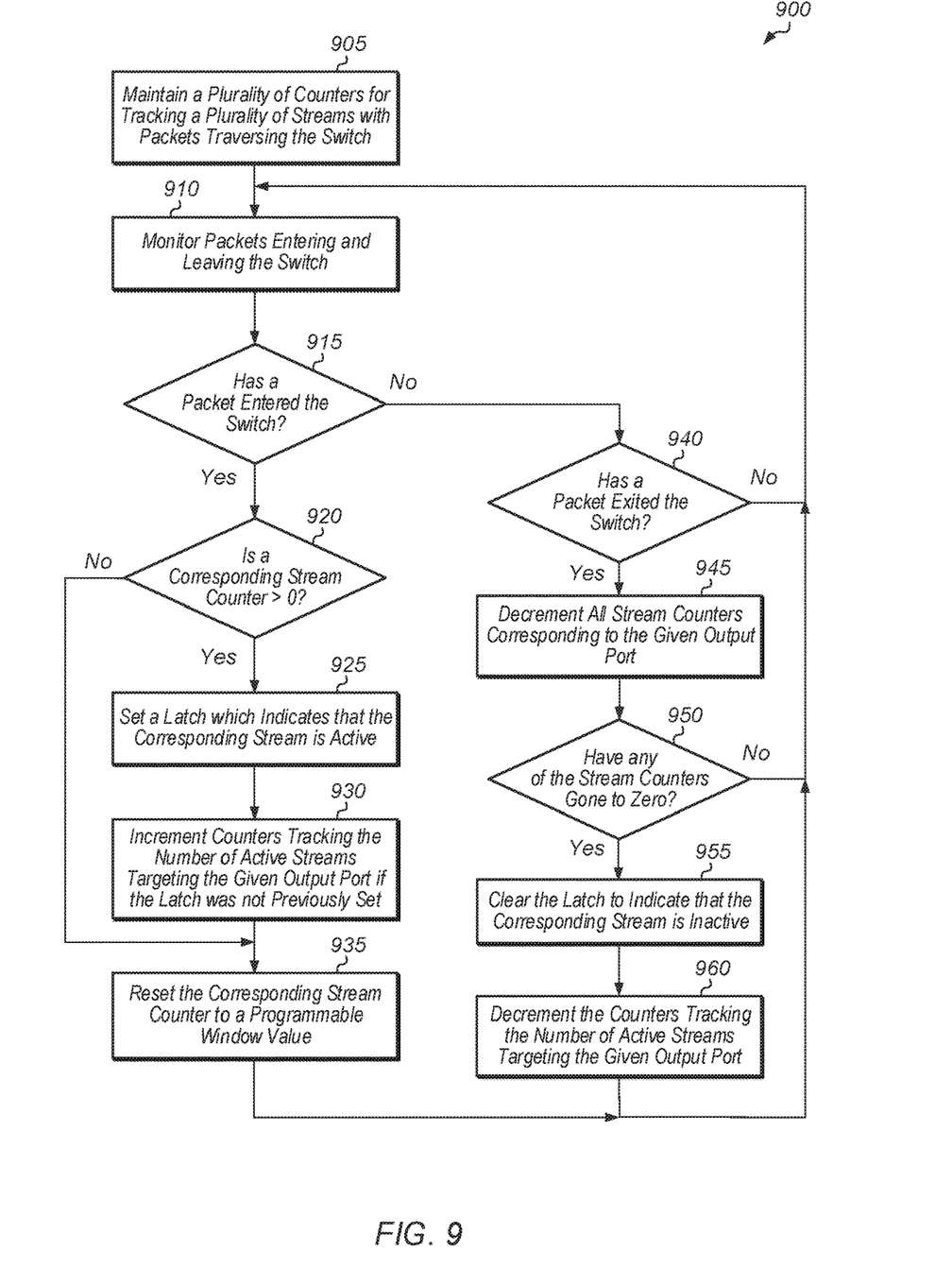
FIG. 9 is a generalized flow diagram illustrating one embodiment of a method for monitoring active streams on a switch.

Also, the switch calculates a total number of active streams targeting the given output port across all of the input ports (block 810). One example of an implementation of block 810 in accordance with one embodiment is also described below in the discussion regarding method 900. Additionally, the switch optionally applies a weight per stream to bias the calculation of the number of active streams targeting the given output port (block 815). Next, the switch calculates a per-input port throttle factor, wherein the throttle factor for a given input port is equal to the number of active streams on the input port targeting the given output port divided by the total number of active streams on the switch targeting the given output port (block 820).

Then, the switch applies the throttle factors to the flow control scheme to regulate input bandwidth (block 825). After block 825, method 800 ends. In one embodiment, applying the throttle factors includes allocating a given number of tokens to the streams on each input port, wherein the given number is equal to a product of the throttle factor and a number of available tokens. This embodiment is described in further detail below in the discussion regarding method 900. In another embodiment, the throttle factor can be used to communicate a stall to an incoming port for each VC. The stall can be communicated either in-band or through a sideband. In a further embodiment, the switch applies a throttle, based on the throttle factor, on the packets that are flowing through the switch instead of relying on the inputs to throttle themselves.

Turning now to FIG. 9, one embodiment of a method 900 for monitoring active streams on a switch is shown. The switch maintains a plurality of counters for tracking a plurality of streams with packets traversing the switch (block 905). The plurality of counters includes a counter for each stream, with these counters referred to as stream counters. The stream counters are utilized to determine if the corresponding streams are currently active. The plurality of counters maintained by the switch also include first counters for each input port to track the number of streams on a respective input port targeting a given output port. The plurality of counters maintained by the switch also include second counters to track the total number of streams on all input ports of the switch that are targeting a given output port. Additionally, the switch monitors packets entering and leaving the switch (block 910).

When a packet enters the switch on one of the input ports (conditional block 915, "yes" leg), the switch determines if a corresponding stream counter is greater than zero (conditional block 920). The corresponding stream counter refers to the counter maintained for the stream to which the packet belongs based on one or more properties of the packet. If the corresponding stream counter is greater than zero (conditional block 920, "yes" leg), then a latch is set which indicates that the corresponding stream is active (block 925). Also, the switch increments counters tracking the number of active streams targeting the given output port if the latch was not previously set (block 930). The counters which are incremented in block 930 include a first counter tracking the number of streams, on the input port where the packet entered, which are targeting the output port targeted by the packet. The counters which are incremented in block 930 also include a second counter tracking the total number of streams traversing the switch which are targeting the output port targeted by the received packet. Additionally, the switch resets the corresponding stream counter to a programmable window value (block 935). If the corresponding stream counter is equal to zero (conditional block 920, "no" leg), then method 900 jumps to block 935. If a packet has not entered the switch (conditional block 915, "no" leg), then the switch determines if a packet has exited the switch through an output port (conditional block 940).

If a packet exits the switch through an output port (conditional block 940, "yes" leg), then all stream counters corresponding to the given output port are decremented (block 945). If any of the stream counters goes to zero (conditional block 950, "yes" leg), then the latch for the corresponding stream is cleared to indicate that the stream is inactive (block 955). Also, the switch decrements the counters tracking the number of active streams targeting the given output port (block 960). After block 960, method 900 returns to block 910.

In various embodiments, program instructions of a software application are used to implement the methods and/or mechanisms described herein. For example, program instructions executable by a general or special purpose processor are contemplated. In various embodiments, such program instructions can be represented by a high level programming language, iirt other embodiments, the program instructions can be compiled from a high level programming language to a binary, intermediate, or other form. Alternatively, program instructions can be written that describe the behavior or design of hardware. Such program instructions can be represented by a high-level programming language, such as C. Alternatively, a hardware design language (HDL) such as Jerilog can be used. In various embodiments, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
a plurality of processing units;
a memory; and
a communication fabric coupled to the one or more processing units and the memory, wherein the communication fabric comprises a switch comprising a plurality of input ports and a plurality of output ports and the switch is configured to:
responsive to detecting an incoming packet corresponding to a first stream on a first input port targeting a first output port:
if a value of a master counter corresponding to the first stream is greater than zero:
store an indication that the first stream is active;
increment a counter corresponding to the first output port; and
reset the master counter corresponding to the first stream to a programmable window value;
if the value of the master counter corresponding to the first stream is equal to zero:
reset the master counter corresponding to the first stream to the programmable window value without storing an indication that the first stream is active;
determine a first number of streams on the first input port that are targeting the first output port;
determine a second number of streams, from all input ports, that are targeting the first output port based on a value stored in the counter corresponding to the first output port;
calculate a throttle factor for the first input port by dividing the first number of streams by the second number of streams; and
apply the throttle factor to regulate bandwidth on the first input port for streams targeting the first output port.

2. The system as recited in claim 1, wherein:
each stream corresponds to a group of packets that share one or more properties;
applying the throttle factor to regulate bandwidth on the first input port for the streams targeting the first output port comprises allocating a given number of tokens to the streams; and
the given number is equal to a product of the throttle factor and a number of available tokens.

3. The system as recited in claim 1, wherein:
each stream corresponds to a separate virtual channel;
the switch is configured to maintain a counter for each stream on the first input port targeting the first output port and the counter for a given stream indicates whether the given stream is active or inactive.

4. The system as recited in claim 3, wherein the switch is further configured to decrement all counters corresponding to the streams targeting the first output port responsive to detecting an outgoing packet being sent out of the first output port.

5. The system as recited in claim 1, wherein responsive to detecting a packet corresponding to the first stream has exited the switch via the first output port, the switch is further configured to:
decrement the master counter corresponding to the first stream; and decrement the counter corresponding to the first output port.

6. The system as recited in claim 1 wherein the switch is further configured to clear the indication that the first stream is active in response to detecting a packet has exited the switch via the first output port and the master counter corresponding to the first stream is zero.

7. A method for use in a switch comprising a plurality of input ports and a plurality of output ports, the method comprising:
  detecting an incoming packet on a first input port;
  responsive to detecting the incoming packet corresponds to a first stream on the first input port and targets a first output port:
    if a value of a master counter corresponding to the first stream is greater than zero:
      storing an indication that the first stream is active; and
      incrementing a counter corresponding to the first output port; and
      resetting the master counter corresponding to the first stream to a programmable window value;
    if the value of the master counter corresponding to the first stream is equal to zero:
      resetting the master counter corresponding to the first stream to the programmable window value without storing an indication that the first stream is active;
  determining a first number of streams on the first input port that are targeting the first output port;
  determining a second number of streams, from all input ports, that are targeting the first output port based on a value stored in the counter corresponding to the first output port;
    calculating a throttle factor for the first input port by dividing the first number of streams by the second number of streams; and
  applying the throttle factor to regulate bandwidth on the first input port for streams targeting the first output port.

8. The method as recited in claim 7, wherein:
each stream corresponds to a group of packets that share one or more properties;
applying the throttle factor to regulate bandwidth on the first input port for the streams targeting the first output port comprises allocating a given number of tokens to the streams and
the given number is equal to a product of the throttle factor and a number of available tokens.

9. The method as recited in claim 7, wherein:
each stream corresponds to a separate virtual channel;
the method further comprising maintaining a counter for each stream on the first input port targeting the first output port; and
the counter for a given stream indicates whether the given stream is active or inactive.

10. The method as recited in claim 7, wherein responsive to detecting a packet corresponding to the first stream has exited the switch via the first output port, the method further comprises:
  decrementing the master counter corresponding to the first stream; and
  decrementing the counter corresponding to the first output port.

11. The method as recited in claim 7, further comprising clearing the indication that the first stream is active in response to detecting a packet has exited the switch via the first output port and the master counter corresponding to the first stream is zero.

12. An apparatus comprising:
a plurality of counters; and
a switch comprising a plurality of input ports and a plurality of output ports;
wherein the switch is configured to:
  responsive to detecting an incoming packet corresponding to a first stream on a first input port targeting a first output port:
    if a value of a master counter corresponding to the first stream is greater than zero:
      store an indication that the first stream is active;
      increment a counter corresponding to the first output port; and
      reset the master counter corresponding to the first stream to a programmable window value;
    if the value of the master counter corresponding to the first stream is equal to zero:
      reset the master counter corresponding to the first stream to the programmable window value without storing an indication that the first stream is active;
  determine a first number of streams on the first input port that are targeting the first output port;
  determine a second number of streams, from all input ports, that are targeting the first output port based on a value stored in the counter corresponding to the first output port;
  calculate a throttle factor for the first input port by dividing the first number of streams by the second number of streams; and
  apply the throttle factor to regulate bandwidth on the first input port for streams targeting the first output port.

13. The apparatus as recited in claim 12, wherein:
each stream corresponds to a group of packets that share one or more properties;
applying the throttle factor to regulate bandwidth on the first input port for the streams targeting the first output port comprises allocating a given number of tokens to the streams; and
the given number is equal to a product of the throttle factor and a number of available tokens.

14. The apparatus as recited in claim 12, wherein:
each stream corresponds to a separate virtual channel;
the switch is further configured to maintain a counter for each stream on the first input port targeting the first output port; and
the counter indicates whether the respective stream is active or inactive.

15. The apparatus as recited in claim 14, wherein the switch is further configured to decrement all counters corresponding to the streams targeting the first output port responsive to detecting an outgoing packet being sent out of the first output port.

* * * * *